(12) United States Patent
Oh et al.

(10) Patent No.: US 7,662,202 B2
(45) Date of Patent: Feb. 16, 2010

(54) DUST COLLECTOR OF VACUUM CLEANER

(75) Inventors: Jang-keun Oh, Gwangju (KR);
Seoung-yun Seol, Gwangju (KR);
Kwang-su Heo, Gwangju (KR); Min-ha Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 515 days.

(21) Appl. No.: 11/600,996

(22) Filed: Nov. 17, 2006

(65) Prior Publication Data

US 2007/0289269 A1  Dec. 20, 2007

Related U.S. Application Data

(60) Provisional application No. 60/814,797, filed on Jun. 19, 2006.

(30) Foreign Application Priority Data

Jul. 10, 2006 (KR) ............... 10-2006-0064224

(51) Int. Cl.
*B01D 45/12* (2006.01)
(52) U.S. Cl. ............... 55/459.1; 55/337; 55/DIG. 3; 55/462; 55/428; 55/447; 55/456; 55/457; 15/353
(58) Field of Classification Search ............... 55/337, 55/DIG. 3, 462, 428, 447, 459.1, 456, 457; 15/353
See application file for complete search history.

(56) References Cited

U.S. PATENT DOCUMENTS

| 6,485,536 | B1 | 11/2002 | Masters | 55/337 |
| 6,746,500 | B1 | 6/2004 | Park et al. | 55/343 |
| 7,222,392 | B2* | 5/2007 | McCormick et al. | 15/353 |
| 7,422,615 | B2* | 9/2008 | Kim | 55/426 |
| 2001/0052166 | A1* | 12/2001 | Park et al. | 15/353 |
| 2002/0011053 | A1* | 1/2002 | Oh | 55/426 |
| 2004/0194250 | A1* | 10/2004 | Conrad et al. | 15/353 |
| 2004/0231091 | A1* | 11/2004 | Oh | 15/347 |
| 2007/0011997 | A1* | 1/2007 | Han et al. | 55/337 |
| 2007/0011998 | A1* | 1/2007 | Yoo et al. | 55/337 |
| 2007/0012002 | A1* | 1/2007 | Oh et al. | 55/428 |
| 2007/0079587 | A1* | 4/2007 | Kim | 55/349 |

FOREIGN PATENT DOCUMENTS

| EP | 1681099 A2 | 7/2006 |
| KR | 1020020072009 | 9/2002 |
| KR | 100560967 | 3/2006 |

\* cited by examiner

*Primary Examiner*—Jason M Greene
*Assistant Examiner*—Dung Bui
(74) *Attorney, Agent, or Firm*—Ohlandt, Greeley, Ruggiero & Perle, L.L.P.

(57) ABSTRACT

Disclosed is a dust collector of a vacuum cleaner. The dust collector comprises: a cyclone body forming a cyclone chamber and having a bottom wall and an air inlet, air being admitted into the cyclone chamber and rotating in the cyclone chamber; an outlet pipe extending upwardly from the bottom wall of the cyclone body; and a dust-bin body surrounding the cyclone body in such a manner that a dust collection space is formed between the dust-bin body and the cyclone body. The inner diameter of the cyclone body is increased as approaching a height near the top end of the outlet pipe from the bottom wall of the cyclone body.

14 Claims, 4 Drawing Sheets

DUST COLLECTOR OF VACUUM CLEANER

CROSS-REFERENCE TO RELATED APPLICATIONS

This application claims the priority from U.S. Provisional Application No. 60/814,797, filed on Jun. 19, 2006, with the United States Patents and Trademark Office, and from Korean Patent Application No. 10-2006-0064224, filed on Jul. 10, 2006, with the Korean Intellectual Property Office, the disclosure of each of which is incorporated herein by reference.

BACKGROUND OF THE INVENTION

1. Field of the Invention

The present disclosure relates to a dust collector of a vacuum cleaner, and in particular to a dust collector for separating dust contained in air by rotating the air.

2. Description of the Related Art

In general, so-called cyclone dust collectors, which rotate air so as to separate dust from the air by the difference in centrifugal force between the air and the dust, have been recently applied to a number of vacuum cleaners and various types of cyclone dust collectors have been developed.

The applicant has developed a dust collector comprising a cylindrical cyclone body, and a dust-bin body surrounding the cyclone body (Korean Patent Publication No. 560967). In this dust collector, external air is admitted through the bottom wall of the cyclone body and rotates and ascends within the cyclone body, and dust is discharged into a dust collection space positioned outside of the cyclone body through a dust discharge port formed at a toptop end of the cyclone body. Therefore, it is possible to increase the dust collection space as compared to a conventional dust collector in which a cyclone chamber and a dust collection space are arranged one above the other. In addition, such a dust collector can be easily applied to a canister type cleaner because its height is reduced as compared with a conventional one. Furthermore, even if the dust collector is tilted or overturned, it is possible to prevent the dust or dirt collected in the dust collection space from flowing backward to the cyclone chamber again.

However, because an air inlet and an air outlet pipe are positioned in the bottom part of the dust collector, there is a serious problem in that air cannot ascend any more at an area near the top end of the air outlet pipe when it is admitted into the dust collector and ascends in the dust collector, whereby a large amount of air is directly discharged through the air outlet pipe although dust or dirt has not yet been removed from the air. Therefore, the dust-collection efficiency of the dust collector is deteriorated to some extent.

In order to solve the above-mentioned problems, the applicant has performed continuous research.

SUMMARY OF THE INVENTION

Accordingly, the present disclosure has been made to solve at least the above-mentioned problems occurring in the prior art, and an object of the present disclosure is to provide a dust collector of a vacuum cleaner, which is adapted to restrain air from being discharged from a cyclone chamber when the dust or dirt is not removed from the air and to reduce a pressure loss around an air outlet, thereby improving the dust collection efficiency of the dust collector.

In order to achieve the above-mentioned and other objects, there is provided a dust collector comprising: a cyclone body forming a cyclone chamber, into which air is admitted in such a manner as to rotate, the cyclone body having a bottom wall and an air inlet; an outlet pipe extending upwardly from the bottom wall of the cyclone body; and a dust-bin body surrounding the cyclone body in such a manner that a dust collection space is formed between the dust-bin body and the cyclone body, wherein the inner diameter of the cyclone body is increased from the bottom wall of the cyclone body to a height near the top end of the outlet pipe.

With this arrangement, because the space for allowing air to rotate is broader at an area near the top end of the outlet pipe than at an area near the air inlet, through which the air is admitted, the flow rate of the air and hence the pressure loss are reduced at the area near the top end of the outlet pipe. The amount of air, which is discharged through the outlet pipe without ascending in a state in which dust or dirt is not removed from the air, can be substantially reduced, whereby the dust collection efficiency of the dust collector can be enhanced.

Here, the air inlet may be formed through the bottom wall of the cyclone body and a dust discharge port may be formed at the top end of the cyclone body, so that air containing dust or dirt is admitted into the cyclone body through the bottom wall and then rotates and ascends in the cyclone chamber, whereby the dust or dirt can be discharged to the dust collection space through the dust discharge port.

According to a first embodiment of the present disclosure, the cyclone body is formed in a barrel shape having inflection points at the height near the top end of the outlet pipe, so that the inner diameter of the cyclone body is largest at the height near the top end of the outlet pipe and the inner diameter decreases towards both the top or bottom end of the cyclone body from the height near the top end of the outlet pipe.

Here, the dust collector may further comprise a cover member capable of covering the top of the cyclone body and the dust-bin body, and a rotation guide member depending from the bottom surface of the cover member. In addition, the rotation guide member may be formed in a hollow shape, the inner diameter of which is reduced as approaching the top end thereof, so that the distance between the inner surface of the cyclone body and the outer surface of the rotation guide member is not changed so large.

According to a second embodiment of the present disclosure, the cyclone body comprises an upper side wall in a truncated cone shape, and a lower side wall in an inverted truncated cone shape, which are integrally combined with each other in such a manner that an angular part is formed between them, the inner diameter of the cyclone body is largest at the height near the top end of the outlet pipe, and the inner diameter decreases towards both the top end or bottom end of the cyclone body from the height near the top end of the outlet pipe.

According to a third embodiment of the present disclosure, the cyclone body comprises a lower side wall in a bowl shape, the inner diameter of which is gradually increased as approaching the top end thereof, and an upper side wall in a cylindrical shape vertically extending from the top end of the lower side wall, so that the inner diameter of the cyclone body is largest at the height near the top end of the outlet pipe and the inner diameter is reduced as approaching the bottom end of the cyclone body from the height near the top end of the outlet pipe.

In addition, according to a third embodiment of the present disclosure, the cyclone body comprises a lower side wall in an inverted truncated cone shape, the inner diameter of which is reduced as approaching the bottom end thereof, and an upper side wall in a cylindrical shape vertically extending from the top end of the lower side wall, so that the inner diameter of the cyclone body is increased as approaching the height near the top end of the outlet pipe from the bottom end of the cyclone body and then retained constant to the top end of the cyclone body from the area near the top end of the outlet pipe.

In the above-mentioned dust collector, because air is restrained from being discharged through the outlet pipe in a state in which dirt or dust is not removed from the air, the dust separation efficiency of the dust collector can be enhanced. In addition, because the flow rate of air is reduced at an area near the top end of the outlet pipe, the pressure loss can be substantially reduced, which occurs when air is rapidly sucked into the outlet pipe.

BRIEF DESCRIPTION OF THE DRAWINGS

The above aspects and features of the present disclosure will be more apparent from the description for certain embodiments of the present disclosure taken with reference to the accompanying drawings, in which.

DETAILED DESCRIPTION OF THE PREFERRED EMBODIMENTS

Hereinbelow, the preferred embodiments of the present disclosure are described in detail with reference to accompanying drawings. In the following description, a detailed description of known functions and configurations incorporated herein will be omitted when it may make the subject matter of the present disclosure rather unclear.

Figure 1:
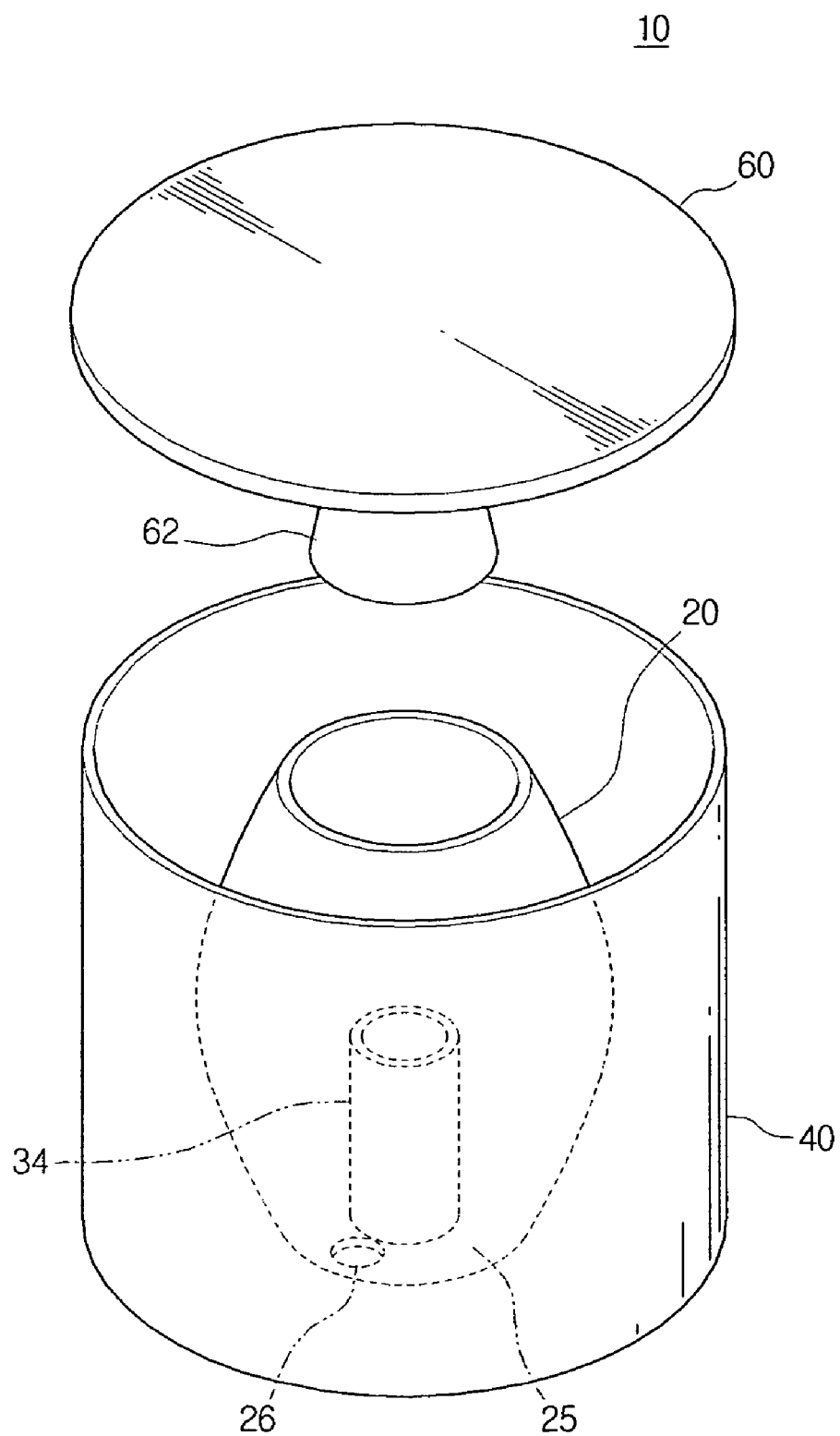
FIG. 1 is a top perspective view showing a first exemplary embodiment of a dust collector, in which a cover member is separated from a dust-bin body, according to the present disclosure.
Figure 2:
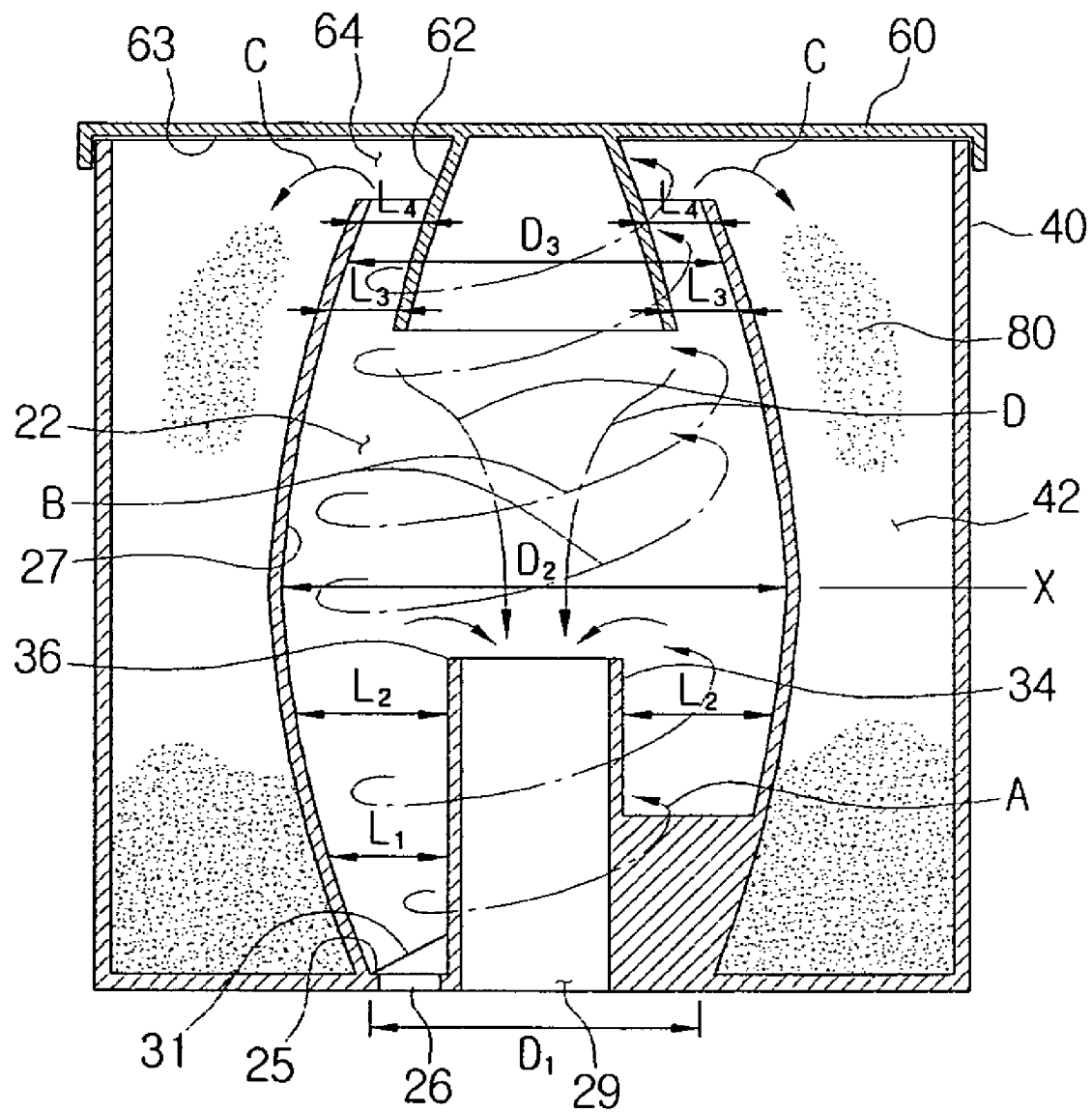
FIG. 2 is a cross-sectional view of the dust collector shown in FIG. 1 having its cover member connected to the dust-bin body.

FIGS. 1 and 2 show a first embodiment of a dust collector 10, in which FIG. 1 is a perspective view showing a first embodiment of the dust collector 10, in which a cover member 60 is separated from a dust-bin body 20, and FIG. 2 is a cross-sectional view of the dust collector shown in FIG. 1, in which the cover member 60 is connected to the dust-bin body 40.

Referring to FIGS. 1 and 2, the dust collector 10 of a vacuum cleaner according to the first embodiment of the present disclosure comprises a cyclone body 20, a dust-bin body 40, and a cover member 60.

The cyclone body 20 is formed in a barrel shape, the inside of which forms a cyclone clamber 22, into which air is admitted in such a manner as to rotate, wherein the cyclone body 20 includes an air inlet 26, an outlet pipe 34, and a helical guide 31. The air inlet 26 is formed through a side part of the bottom wall of the cyclone body 20. The outlet pipe 34, through which air is discharged, also extends vertically upward from the bottom wall of the cyclone body 20. The air inlet 26 is connected to a suction brush (not shown) of a vacuum cleaner (not shown) in such a manner as to serve as a passage, through which air containing dust or dirt is admitted into the cyclone chamber 22.

Although the air inlet 26 is formed through the bottom wall of the cyclone body 20 in the present embodiment, it is possible to form the air inlet at a lower side portion in such a manner that it extends through the bottom walls of the dust-bin body 40 and the cyclone chamber 22. The helical guide 31 is formed in a helical shape in such a manner as to extend upward from the air inlet 26 while surrounding the circumference of the outlet pipe 34. The helical guide 31 guides the air admitted through the air inlet to ascend and rotate around the outlet pipe 34. The outlet pipe 34 is formed from a linear pipe and serves as a center of rotation for causing the air admitted through the air inlet 26 to rotate as well as serves as a passage, through which dust separated from the air is discharged to the outside. The outlet pipe 34 extends vertically upward from an air outlet 29, which is formed through the bottom wall of the cyclone body 20. The top end of the outlet pipe 34 is positioned slightly below the widest area (the height of X-axis) of the cyclone body 20 as shown in FIG. 2. However, it is also contemplated by the present disclosure that the top end of the outlet pipe 34 may also be positioned at a height corresponding to the X-axis. However, if the top end of the outlet pipe 34 is higher than the X-axis illustrated in FIG. 2, it has been determined by the present disclosure that the dust-collection efficiency will be deteriorated.

The cyclone body 20 is formed in a barrel shape having inflection points at the height of the X-axis, wherein the inner diameter of the cyclone body 20 is largest at the inflection points, i.e., at the height of the X-axis and decreases as approaching the lower end. Therefore, $L_1$ is smaller than $L_2$, as shown in FIG. 2, wherein $L_1$ and $L_2$ indicate the distance between the outer surface of the outlet pipe 34 and the inner surface of the cyclone body 20. The widest area of the barrel shape is positioned slightly above the top end 36 of the outlet pipe 34 and has an inner diameter D2, which is larger than an inner diameter D1 of an area positioned below the bulge area, wherein the inner diameter D2 is the largest inner diameter in the entirety of the cyclone body 20. The upper and lower parts of cyclone body 20 with reference to the X-axis have curved cross-sections, which are symmetric to each other. Thus, the cyclone body 20 also has an inner diameter D3 at its upper part that is smaller than the inner diameter D2.

Preferably, the inner diameter of cyclone body 20 gradually increases as approaching the height of X-axis from the bottom surface 25, i.e., as approaching the top end of the outlet pipe 34, so that the inner space for allowing air to rotate is gradually increased. Therefore, as shown in FIG. 2, the inner space for allowing air to rotate is narrowest at the bottom surface of the cyclone body 20 and becomes broader as the air ascends and approaches the height of the X-axis, whereby the inner space is broadest at the height of the X-axis. Therefore, upon being admitted rapidly through the air inlet 26, external air ascends along the helical guide 31 while rapidly rotating around the outlet pipe 34 within the narrow space. Because the space allowing the air to rotate is increased as the air ascends, the rotating speed of the air is reduced and becomes smallest at the height of the X-axis, i.e., near the top end of the outlet pipe 34. Therefore, dust-contained air ascends while tracing large circles along the inner surface 27 of the cyclone body 20, i.e., around the periphery of the cyclone chamber 22 rather than around the central area of the cyclone chamber 22, as a result of which it is difficult for the air to be directly discharged through the outlet pipe 34 in a state in which dirt or dust is not removed from the air. Consequently, the dust separation efficiency can be enhanced.

In addition, the cyclone body 20 is configured in such a manner that the inner diameter is reduced as approaching the top end of the cyclone body 20 from the X-axis in FIG. 2. In general, the rotating flow rate of air is reduced as being spaced away from the air inlet 26. However, because the area of the space for allowing the air to rotate is reduced again by inner diameter D3, the rotating flow rate of the air can be increased again, whereby the rotating flow rate of the air can be retained substantially constant generally in the area above the X-axis.

The dust-bin body 40 is formed in a cylindrical shape surrounding the cyclone body 20 in the outside of the cyclone body 20 so that a dust collection space 42 is formed between the cyclone body 20 and the dust-bin body 40. With this arrangement, it is possible to obtain a broad dust collection space 42 as compared with a conventional arrangement in which a cyclone body 20 and a dust-bin body 40 are installed up and down. In particular, it is possible to reduce the height of the dust collector 10, which will contribute to the miniaturization of a vacuum cleaner and make it possible to apply the dust collector 10 as a dust collector for a canister type cleaner. The height of the dust-bin body 40 is higher than that of the cyclone body 20. Therefore, as can be seen from FIG. 2, between the top end of the cyclone body 20 and the bottom surface 63 of the cover member 60, there is provided a dust discharge port 64, through which dust can be moved. The dust discharge port 64 is formed on the top end of the cyclone body 20 over 360 degrees, and dust rotating and ascending from the cyclone chamber 22 is discharged to the dust collection space 42 through the dust discharge port 64 by centrifugal force. In this manner, because the cyclone chamber 22 and the dust collection space 42 are arranged in parallel and partitioned from each other, dust or dirt hardly flows backward to the cyclone chamber 22 once coming into the dust collection space 42.

The cover member 60 is removably installed on the top end of the dust-bin body 40 in such a manner as to be spaced from the cyclone body 20 and to be in close contact with the top end of the dust-bin body 40, whereby sealing the dust collection space 42 from the external space. At the central of the bottom surface of the cover member 60, there is provided a rotation guide member 42, which is naturally centered to and inserted into the cyclone chamber 22 when the cover member 60 is mounted on the top end of the dust-bin body 40. In the present embodiment, the rotation guide member 42 is configured in a hollow shape, the inner diameter of which is increased as approaching the bottom end thereof. This is to assure that the distance between the inner surface of the cyclone body 20 and the outer surface of the rotation guide member 62 is retained substantially constant irrespective of the height. That is, the curvatures of the cyclone body 20 and the rotation guide member 62 are substantially equal to each other and in FIG. 2, $L_3$ and $L_4$ are substantially equal to each other. Because the distance between the outer surface of the rotation guide member 62 and the inner surface of the cyclone body 20 is not varied so large depending on the height, the flow rate of rotating air is not changed abruptly, whereby it is possible to prevent a vortex phenomenon of air, wherein the vortex phenomenon may occur due to the abrupt change of flow rate in the top area of the cyclone chamber 22.

Now, the operation of the dust collector according to the first embodiment of the present disclosure is described with reference to FIGS. 1 and 2.

External air containing dust or dirt and admitted through a suction brush (not shown) of a vacuum cleaner is rapidly introduced into the cyclone chamber 22 through the air inlet 26 formed through the bottom wall 25 of the cyclone body 20. The air introduced into the cyclone chamber 22 ascends in the narrow space of the lower area of the cyclone chamber 20 while rapidly rotating around the outlet pipe 34 and along the helical guide 31 (arrows A), and then approaches the inner wall of the cyclone body 20 as the rotating velocity thereof is reduced as approaching the height of the X-axis, where the space becomes broadest (arrows B), as a result of which the air is mixed with purified air moving to the outlet pipe 34 from the top side by the way of the center of the cyclone chamber 22 (arrows D) and continuously rotates and ascends without being discharged through the outlet pipe 34. Because the space for allowing air to rotate is reduced as approaching the top end, the air ascends to the top end of the cyclone body 20 in a state in which the rotating velocity is retained substantially in a constant level without being reduced, and then dust or dirt subjected to relatively large centrifugal force is discharged to the dust collection space 42 through the dust discharge port 64 (arrows C). When dust or dirt is removed from the air in this manner, the purified air descends again toward the top end 36 of the outlet pipe 34 by way of the central area of the cyclone chamber 22 (arrows D) and then moves into the motor chamber (not shown) of the vacuum cleaner through the outlet pipe 34 and the air outlet 29 formed through the bottom wall 25 of the cyclone body 20. Like this, by forming the shape of the cyclone body 20 in such a manner that its inner diameter is increased as approaching an area near the top end 36 of the outlet pipe 34 from the bottom area thereof, it is possible to reduce the flow rate of air in the area adjacent to the top end 36 of the outlet pipe 34, thereby restraining air from being directly discharged through the outlet pipe 34 in a state in which dust or dirt is not removed from the air.

Figure 3:
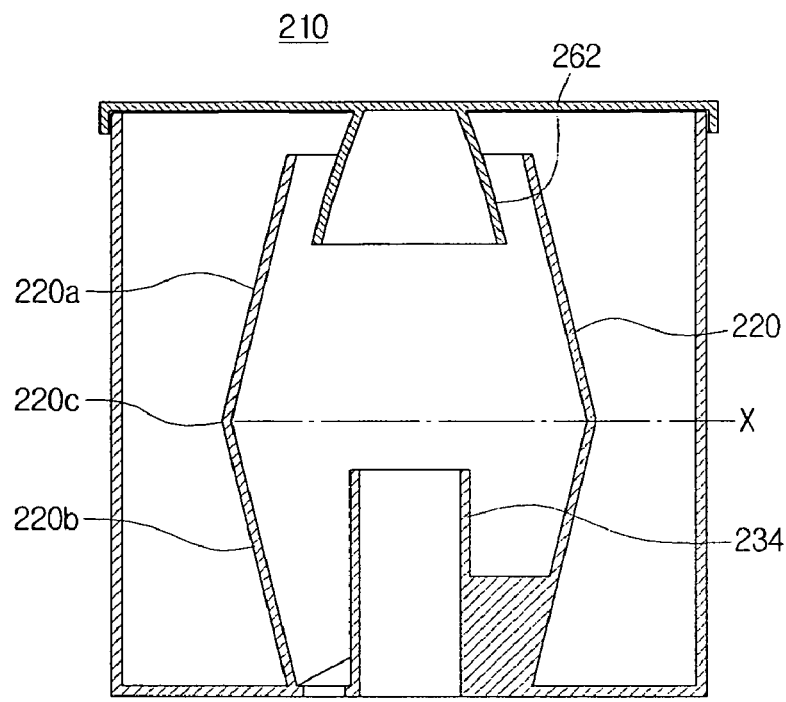
FIG. 3 is a cross-sectional view of a second exemplary embodiment of the dust collector according to the present disclosure.

FIG. 3 is a cross-sectional view of a second embodiment of the dust collector 210. In the present disclosure, the cyclone body 220 is not formed in a barrel shape. Rather, the cyclone body comprises an upper side wall 220a in a truncated cone shape and a lower side wall 220b in an inverted truncated cone shape, which are integrally combined with each other at the height of the X-axis near the top end of the outlet pipe 234, so that an angular portion 220c is formed between them at the position of the X-axis. Therefore, the inner diameter of the cyclone body 220 is increased as approaching the height of the X-axis from the bottom wall of the cyclone body 220 and then reduced again as approaching the top end from the X-axis. The rotation guide member 262 is also formed in a hollow shape, the inner diameter of which is increased as approaching the bottom end thereof. Therefore, the distance between the inner surface and the rotation guide member 262 is substantially constant. Because the remaining components are identical to those of the first embodiment, detailed description thereof is omitted.

Figure 4:
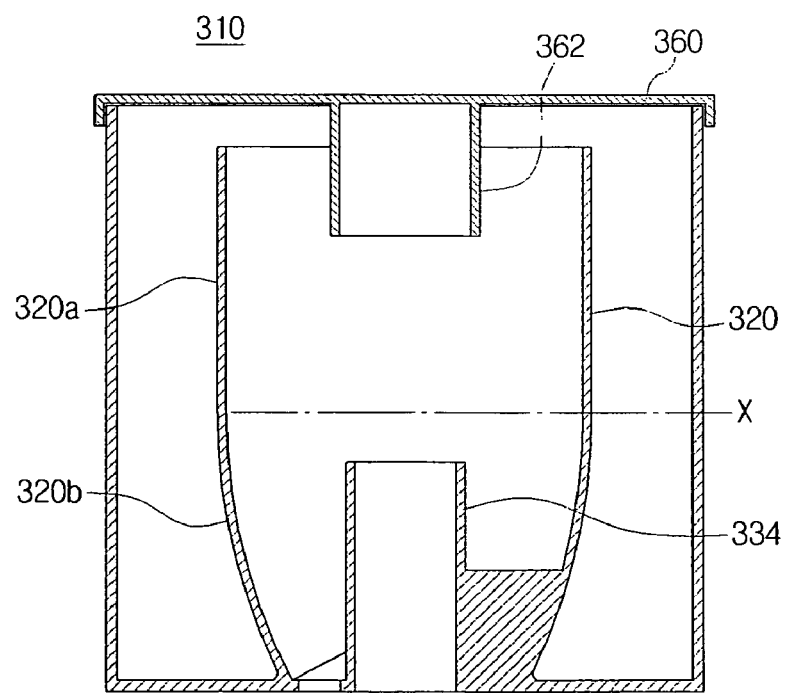
FIG. 4 is a cross-sectional view of a third exemplary embodiment of the dust collector according to the present disclosure.

FIG. 4 is a cross-sectional view of a third embodiment of the dust collector 310. In the present embodiment, the cyclone body 320 comprises, with reference to the X-axis, a lower side wall 320a in a bowl shape, the inner diameter of which is gradually increased as approaching the top end thereof, and an upper side wall 320b in a cylindrical shape vertically extending from the top end of the lower side wall 320a. Therefore, the inner diameter of the cyclone body 320 is increased as approaching the X-axis near the top end of the outlet pipe 334 from the bottom end of the cyclone body 320 and then retained constant above the X-axis. The rotation guide member 362 is also formed in a hollow shape, the inner diameter of which is retained constant, and vertically depends from the bottom surface of the cover member 360. Because the other components are identical to those of the above-mentioned embodiments, detailed description thereof is omitted.

Figure 5:
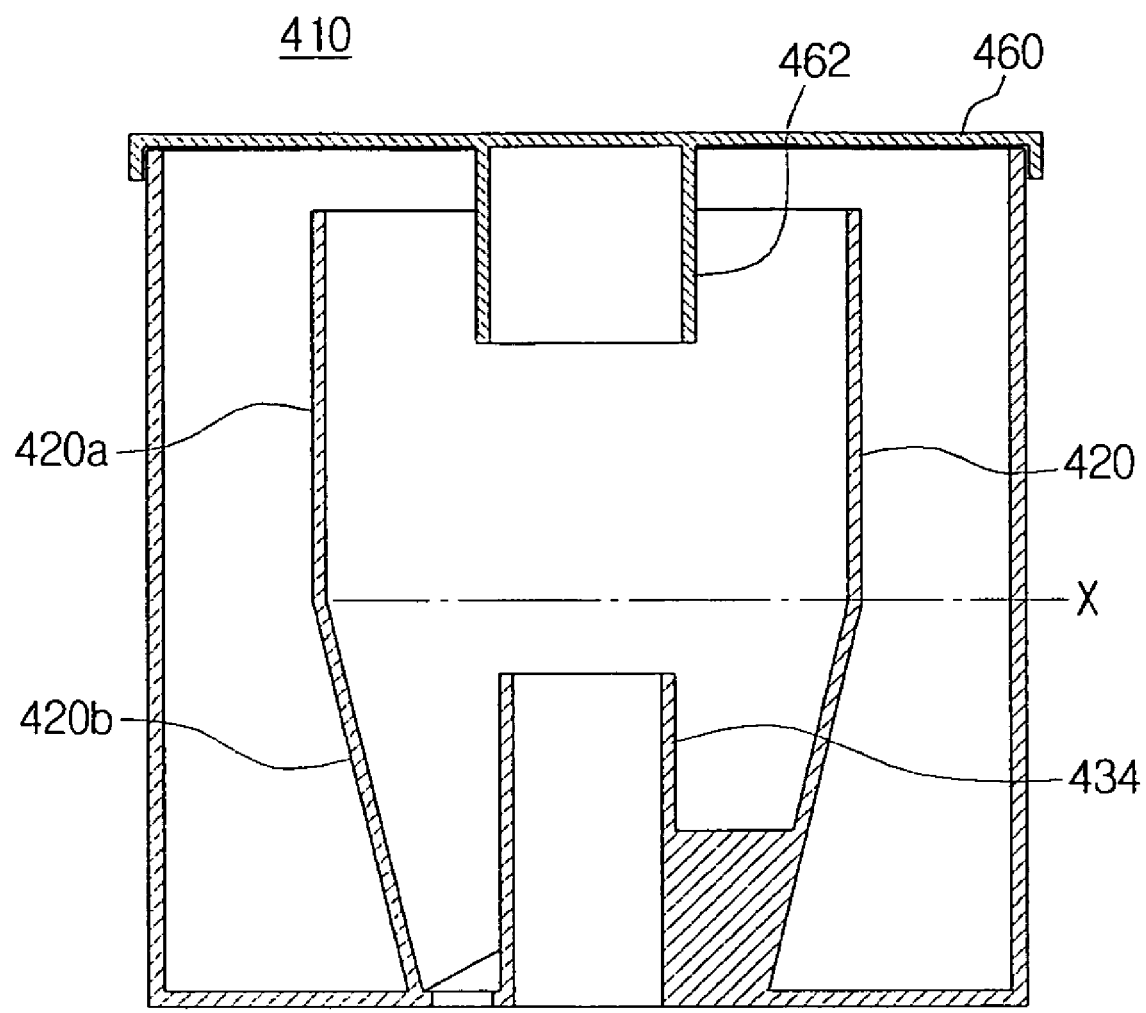
FIG. 5 is a cross-sectional view of a fourth exemplary embodiment of the dust collector according to the present disclosure.

FIG. 5 is a cross-sectional view of a fourth embodiment of the dust collector 410. In the present disclosure, the cyclone body 420 comprises, with reference to the X-axis, a lower side wall 420b in an inverted truncated cone shape, the inner diameter of which is reduced as approaching the bottom end thereof, and an upper side wall 420a in a cylindrical shape vertically extending from the top end of the lower side wall 420b. Therefore, the inner diameter of the cyclone body 420 is increased as approaching the X-axis near the top end of the outlet pipe 434 from the bottom end of the cyclone body 420 and then retained constant to the top end of the cyclone body 420. The rotation guide member 462 is also formed in a hollow shape, the inner diameter of which is retained constant, and vertically depends from the bottom surface of the cover member 460. Because the other components are identical to those of the above-mentioned embodiments, detailed description thereof is omitted.

In the third and fourth embodiments, the inner diameter of the cyclone body is constant from the X-axis to the top end of the cyclone body. Therefore, the flow rate of air, which ascends and rotates, may be somewhat reduced. However, it has been determined by the present disclosure that this will not affect the dust collection efficiency to an undesired level. Rather, an important feature of the present disclosure is that the inner diameter of the cyclone body is largest at an area near the top end of the outlet pipe, through which air is discharged to the outside, and is gradually reduced as approaching the bottom end of the cyclone body. With this feature, it is possible to restrain air from being directly discharged through the outlet pipe in a state in which dust or dirt is not removed from the air, whereby the dust removing efficiency can be enhanced. In addition, it is also possible to prevent the occurrence of a pressure loss caused by high flow rate at an area near the top end of the outlet pipe.

Although representative embodiments of the present disclosure have been shown and described in order to exemplify the principle of the present disclosure, the present disclosure is not limited to the specific embodiments. It will be understood that various modifications and changes can be made by one skilled in the art without departing from the spirit and scope of the disclosure as defined by the appended claims. Therefore, it shall be considered that such modifications, changes and equivalents thereof are all included within the scope of the present disclosure.

What is claimed is:

1. A dust collector comprising:
    a cyclone body forming a cyclone chamber, into which air is admitted in such a manner as to rotate, the cyclone body having a bottom wall and an air inlet;
    an outlet pipe extending upwardly from the bottom wall of the cyclone body; and
    a dust-bin body surrounding the cyclone body in such a manner that a dust collection space is formed between the dust-bin body and the cyclone body,
    wherein the cyclone body has an inner diameter that is increased as approaching a height near a top end of the outlet pipe from the bottom wall of the cyclone body.

2. The dust collector as claimed in claim 1, wherein the air inlet is formed through the bottom wall of the cyclone body and a dust discharge port is formed at the top end of the cyclone body, so that air containing dust or dirt is admitted into the cyclone body through the bottom wall, and rotates and ascends in the cyclone chamber, whereby the dust or dirt is discharged to the dust collection space through the dust discharge port.

3. The dust collector as claimed in claim 1, wherein the cyclone body is formed in a barrel shape having inflection points at the height near the top end of the outlet pipe, so that the inner diameter of the cyclone body is largest at the height near the top end of the outlet pipe and the inner diameter decreases towards both the top and bottom ends of the cyclone body from the height near the top end of the outlet pipe.

4. The dust collector as claimed in claim 3, further comprising:
    a cover member capable of covering the top of the cyclone body and the dust-bin body; and
    a rotation guide member depending from the bottom surface of the cover member.

5. The dust collector as claimed in claim 4, wherein the rotation guide member is formed in a hollow shape, the inner diameter of which is reduced as approaching the top end thereof, so that a distance between an inner surface of the cyclone body and an outer surface of the rotation guide member is substantially similar.

6. The dust collector as claimed in claim 1, wherein the cyclone body comprises an upper side wall in a truncated cone shape, and a lower side wall in an inverted truncated cone shape, which are integrally combined with each other in such a manner that an angular part is formed between them, the inner diameter of the cyclone body is largest at the height near the top end of the outlet pipe, and the inner diameter decreases towards both the top end or bottom end of the cyclone body from the height near the top end of the outlet pipe.

7. The dust collector as claimed in claim 6, further comprising:
    a cover member capable of covering the top of the cyclone body and the dust-bin body; and
    a rotation guide member depending from the bottom surface of the cover member.

8. The dust collector as claimed in claim 7, wherein the rotation guide member is formed in a hollow shape, the inner diameter of which is reduced as approaching the top end thereof, so that a distance between an inner surface of the cyclone body and an outer surface of the rotation guide member is substantially similar.

9. The dust collector as claimed in claim 1, wherein the cyclone body comprises a lower side wall in a bowl shape, the inner diameter of which is gradually increased as approaching the top end thereof, and an upper side wall in a cylindrical shape vertically extending from the top end of the lower side wall, so that the inner diameter of the cyclone body is largest at the height near the top end of the outlet pipe and the inner diameter is reduced as approaching the bottom end of the cyclone body from the height near the top end of the outlet pipe.

10. The dust collector as claimed in claim 9, further comprising:
    a cover member capable of covering the top of the cyclone body and the dust-bin body; and
    a rotation guide member depending from the bottom surface of the cover member.

11. The dust collector as claimed in claim 10, wherein the rotation guide member is formed in a hollow shape, the inner diameter of which is reduced as approaching the top end thereof, so that a distance between an inner surface of the cyclone body and an outer surface of the rotation guide member is substantially similar.

12. The dust collector as claimed in claim 1, wherein the cyclone body comprises a lower side wall in an inverted truncated cone shape, the inner diameter of which is reduced as approaching the bottom end thereof, and an upper side wall in a cylindrical shape vertically extending from the top end of the lower side wall, so that the inner diameter of the cyclone body is increased as approaching the height near the top end of the outlet pipe from the bottom end of the cyclone body and then retained constant to the top end of the cyclone body from the area near the top end of the outlet pipe.

13. The dust collector as claimed in claim 12, further comprising:
    a cover member capable of covering the top of the cyclone body and the dust-bin body; and
    a rotation guide member depending from the bottom surface of the cover member.

14. The dust collector as claimed in claim 13, wherein the rotation guide member is formed in a hollow shape, the inner diameter of which is reduced as approaching the top end thereof, so that a distance between an inner surface of the cyclone body and an outer surface of the rotation guide member is substantially similar.

* * * * *